(12) United States Patent  
Song

(10) Patent No.: US 12,328,043 B1  
(45) Date of Patent: Jun. 10, 2025

(54) MOTOR FRAME APPLIED TO OPTICAL INSTRUMENT ACTUATOR

(71) Applicant: SM TECH CO., LTD, Hwaseong-si (KR)

(72) Inventor: Jaihyun Song, Hwaseong-si (KR)

(73) Assignee: SM TECH CO., LTD, Hwaseong-si (KR)

( * ) Notice: Subject to any disclaimer, the term of this patent is extended or adjusted under 35 U.S.C. 154(b) by 0 days.

(21) Appl. No.: 18/974,712

(22) Filed: Dec. 9, 2024

(30) Foreign Application Priority Data

Dec. 7, 2023 (KR) .......................... 10-2023-0176328

(51) Int. Cl.  
*H02K 15/122* (2025.01)  
*G03B 13/34* (2021.01)  
*H02K 41/035* (2006.01)

(52) U.S. Cl.  
CPC .......... *H02K 15/122* (2025.01); *G03B 13/34* (2013.01); *H02K 41/0354* (2013.01); *Y10T 29/49009* (2015.01)

(58) Field of Classification Search  
CPC .... H02K 11/30; H02K 15/14; H02K 2203/03; H02K 3/28; Y10T 29/49009  
USPC .......................... 29/596, 598, 604, 607, 732  
See application file for complete search history.

(56) References Cited

U.S. PATENT DOCUMENTS

| 10,131,296 B2 * | 11/2018 | Hara | H05K 5/0047 |
| 2012/0181881 A1 * | 7/2012 | Jones | H02K 11/33 |
| | | | 310/43 |

FOREIGN PATENT DOCUMENTS

| CN | 105006716 A | 10/2015 |
| CN | 116683706 A | 9/2023 |
| KR | 10-2008-0099567 A | 11/2008 |
| KR | 10-2016-0120472 A | 10/2016 |
| KR | 10-2019-0047872 A | 5/2019 |
| KR | 10-2019-0111867 A | 10/2019 |
| KR | 10-2021-0118129 A | 9/2021 |
| KR | 10-2023-0089534 A | 6/2023 |
| KR | 10-2555970 B1 | 7/2023 |

* cited by examiner

*Primary Examiner* — Thiem D Phan  
(74) *Attorney, Agent, or Firm* — Revolution IP, PLLC

(57) ABSTRACT

The present invention relates to a motor frame applied to an optical instrument actuator in which a coil is disposed in the magnetic field of a magnet. The motor frame applied to the optical instrument actuator of the present invention includes a frame body injection-molded by inserting a conductive circuit member forming a circuit pattern electrically connected to an electronic component including the coil.

4 Claims, 6 Drawing Sheets

MOTOR FRAME APPLIED TO OPTICAL INSTRUMENT ACTUATOR

CROSS REFERENCE TO PRIOR APPLICATION

This application claims priority to Korean Patent Application No. 10-2023-0176328 filed on Dec. 7, 2023, which are hereby incorporated by reference its entirety.

BACKGROUND OF THE INVENTION

The present invention relates to a motor frame applied to an optical instrument actuator, and more particularly to a motor frame applied to an optical instrument actuator for adjusting the focus of an optical module, such as a small camera.

Portable electronic devices such as smartphones, tablets, and laptop computers, drones, vehicles, etc. are equipped with an optical module, such as a small camera, as a basic item. An actuator having an autofocus (AF) function of linearly moving a lens in an optical axis direction to adjust the focal distance to a subject is used as the optical module.

Korean Patent Application Publication No. 10-2021-0118129 discloses "a voice coil motor for driving a liquid lens and a lens assembly having the voice coil motor". In the prior art document, a movable portion is movable relative to a stationary portion in an optical axis direction, wherein the stationary portion includes a motor base, a plurality of coils, and a plurality of circuit boards, and the movable portion includes a plurality of magnets disposed so as to face the coils, respectively.

More specifically looking into the stationary portion in the prior art document, it can be seen that the plurality of coils is individually fastened to the motor base, a drive and Hall integrated IC is disposed in the middle of each coil, and the circuit boards are disposed on outer surfaces of the plurality of coils and connected thereto by welding.

However, as can be seen from the prior art document, processes of molding the motor base into a complete form, assembling the plurality of circuit boards and the plurality of coils by welding or bonding, and electrically connecting the circuit boards to each other is complicated, resulting in a long manufacturing time, and as each process proceeds, the assembly error rate or defect rate accumulates, causing quality problems of various factors, which in turn increases the manufacturing cost.

In addition, quality problems such as strength reduction or deformation of the motor base during molding of the motor base affect the attachment of the coils and the circuit boards to the motor base in the post-process, resulting in reduced increased productivity and manufacturing cost.

PRIOR ART DOCUMENT

Patent Document

Korean Patent Application Publication No. 10-2021-0118129

SUMMARY OF THE INVENTION

It is an object of the present invention to provide a motor frame applied to an optical instrument actuator, wherein a manufacturing process, such as molding of the motor frame and electrical connection of electronic components, is simplified and quality is improved.

The present invention relates to a motor frame applied to an optical instrument actuator in which a coil is disposed in the magnetic field of a magnet. The motor frame includes a frame body injection-molded by inserting a conductive circuit member forming a circuit pattern electrically connected to an electronic component including the coil.

The frame body may include a protective holder injection-molded by inserting a component mounting portion of the circuit member and a frame structure injection-molded by inserting the protective holder and the circuit member that are integrated after the electronic component is mounted on the component mounting portion inserted in the protective holder, the frame structure being configured to allow a connection circuit portion of the circuit member connected to the component mounting portion to be embedded therein.

The protective holder and the frame body may have an engagement structure formed where the protective holder and the frame body are in contact with each other.

The protective holder may be provided in plural, wherein the plurality of protective holders may be injection-molded by inserting the circuit member in a state in which a plurality of component mounting portions and a connection circuit portion are integrally formed. The frame structure may be injection-molded by inserting the circuit member formed so as to surround the magnet by bending parts of connection circuit portion connected to the component mounting portions.

Each of the protective holder and the frame structure may be injection-molded by inserting the circuit member in the state in which a terminal portion of the circuit member connected to the connection circuit portion is connected to a jig of an injection molding mold.

First, the motor frame applied to the optical instrument actuator of the present invention has the effect that the circuit member and the frame body may be integrated without assembly tolerances by insert injection molding, whereby the quality may be improved and the manufacturing process may be simplified.

Second, the motor frame applied to the optical instrument actuator of the present invention has the effect that the protective holder may be injection-molded by inserting the component mounting portion of the circuit member, and the frame structure may be injection-molded by inserting the protective holder and the circuit member that are integrated, whereby it is possible to prevent thermal damage to the electronic component such as the coil by the protective holder when the frame structure is injection-molded at a high temperature and to injection mold the frame structure at a higher temperature than the protective holder.

Third, the motor frame applied to the optical instrument actuator of the present invention has the effect that a plurality of protective holders is injection-molded by inserting a circuit member in which a plurality of component mounting portions and a connection circuit portion are integrally formed and the circuit member configured in a form of surrounding the magnet is inserted to injection mold a frame structure in a form corresponding thereto, whereby it is possible to simply manufacture the frame body having the circuit member inserted therein through the two injection molding processes.

BRIEF DESCRIPTION OF THE DRAWINGS

FIGS. 1A and 1B are views showing a motor frame applied to an optical instrument actuator according to a first embodiment of the present invention, wherein FIG. 1A shows a motor frame in a first insert injection-molded state and FIG. 1B shows the motor frame having a circuit member inserted therein by a second insert injection molding.

FIGS. 2A and 2B are views showing a motor frame applied to an optical instrument actuator according to a second embodiment of the present invention, wherein FIG. 2A shows a motor frame in a first insert injection-molded state and FIG. 2B shows the motor frame having a circuit member inserted therein by a second insert injection molding.

FIGS. 3A and 3B are views showing a motor frame applied to an optical instrument actuator according to a second embodiment of the present invention, wherein FIG. 3A shows a motor frame in a first insert injection-molded state and FIG. 3B shows the motor frame having a circuit member inserted therein by a second insert injection molding.

DETAILED DESCRIPTION OF THE INVENTION

The technical ideas described in embodiments of the present invention may be practiced independently or in combination. In addition, although the present invention will be described based on embodiments described in the detailed description of the invention given with reference to the drawings, these embodiments are exemplary only, and those skilled in the art to which the present invention pertains will appreciate that various modifications and equivalents thereto are possible therefrom. Accordingly, the technical protection scope of the present invention is to be defined by the appended claims.

Figure 1A:
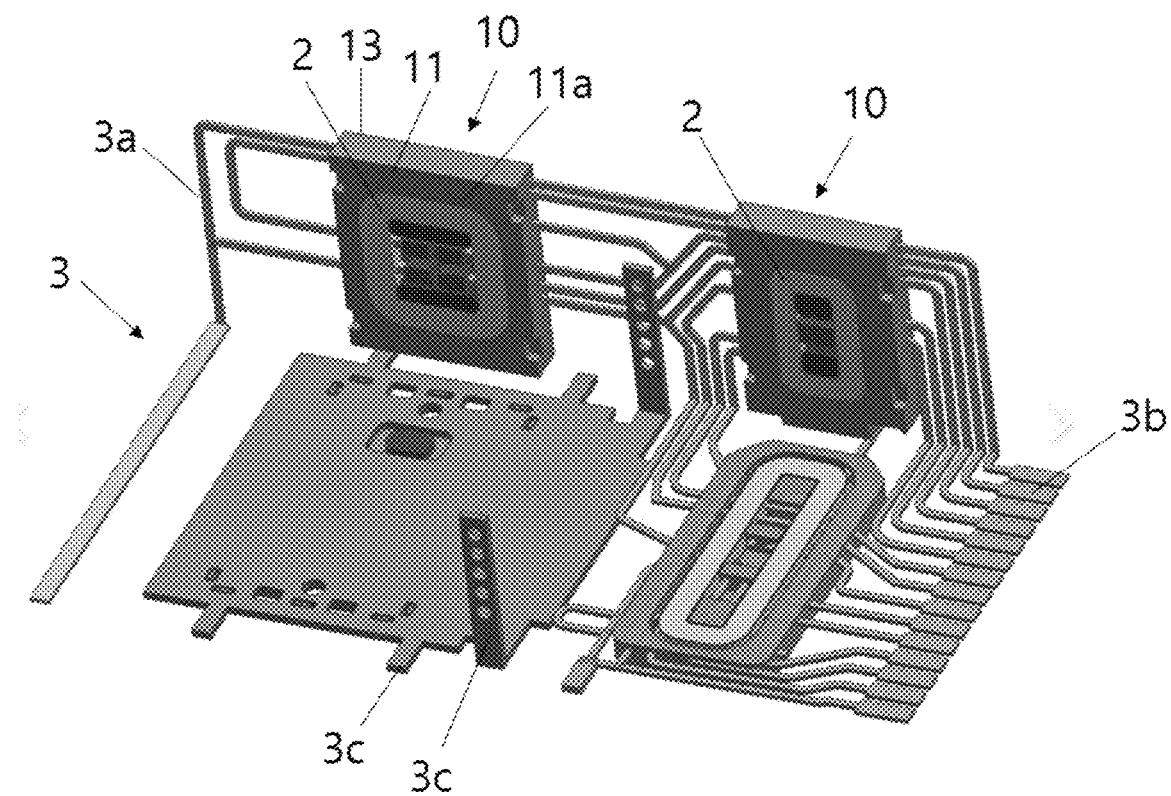
Figure 1B:
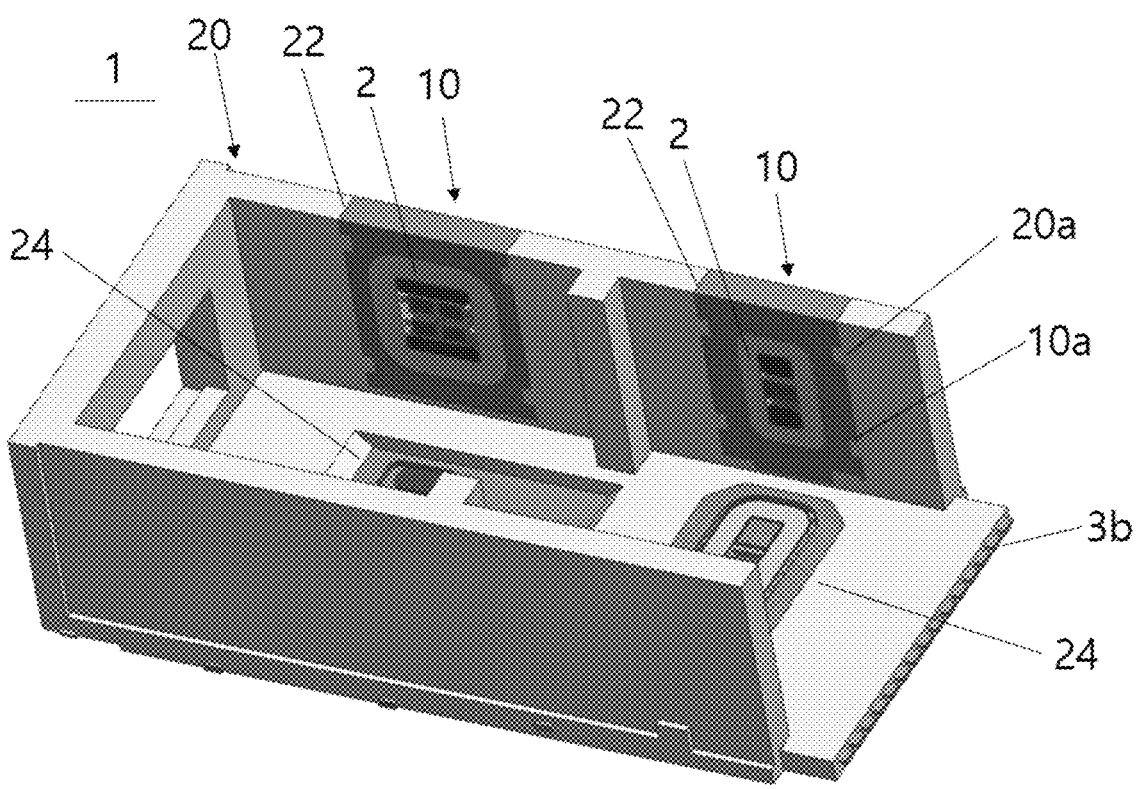
Figure 2A:
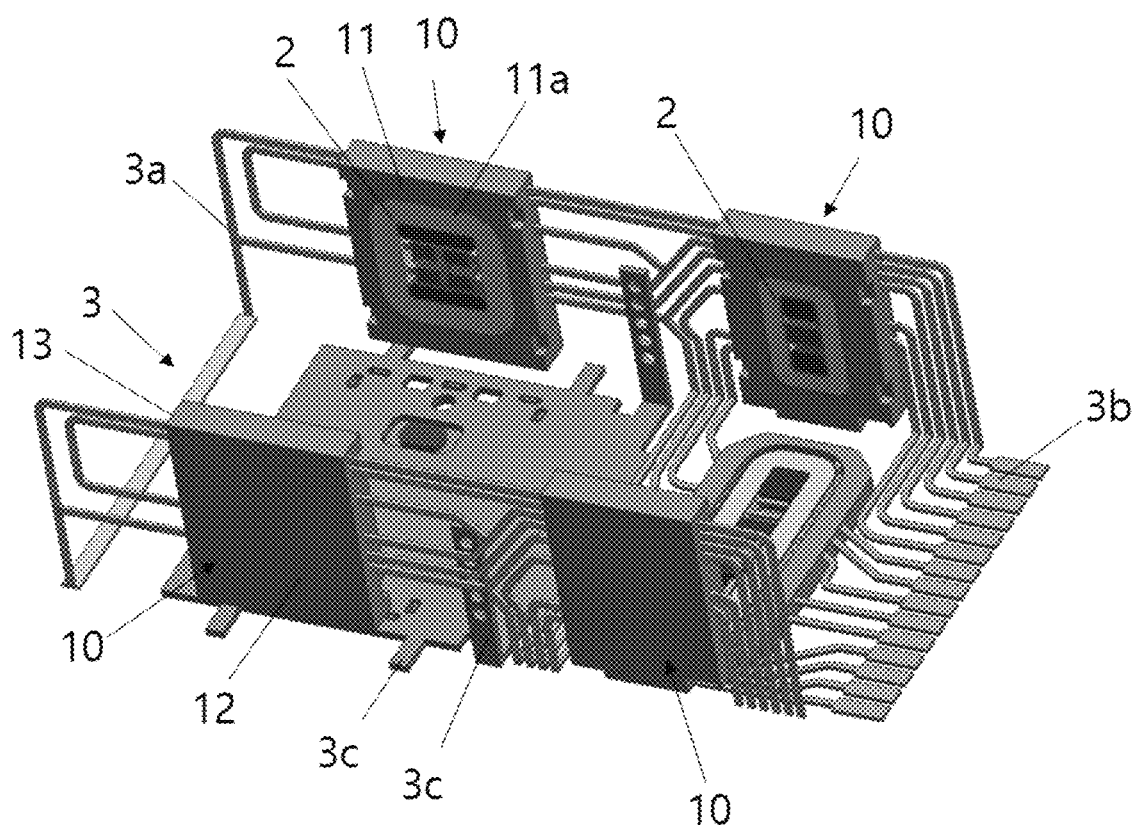
Figure 2B:
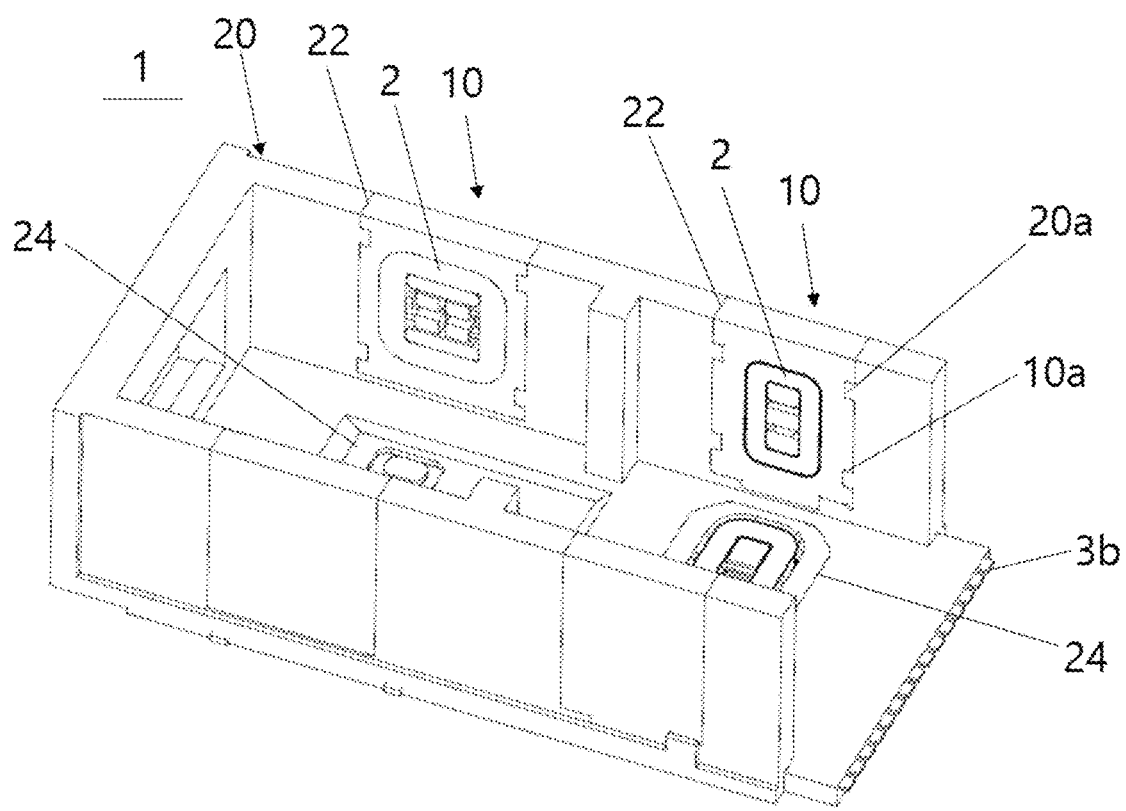
Figure 3A:
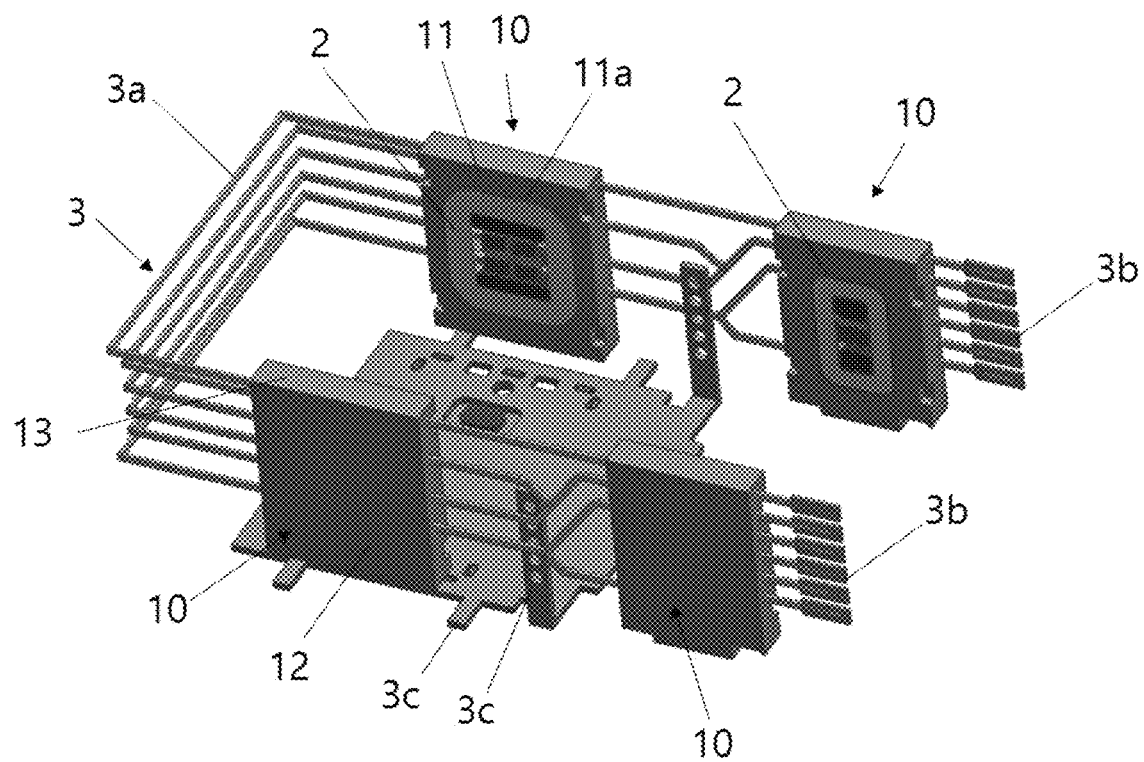
Figure 3B:
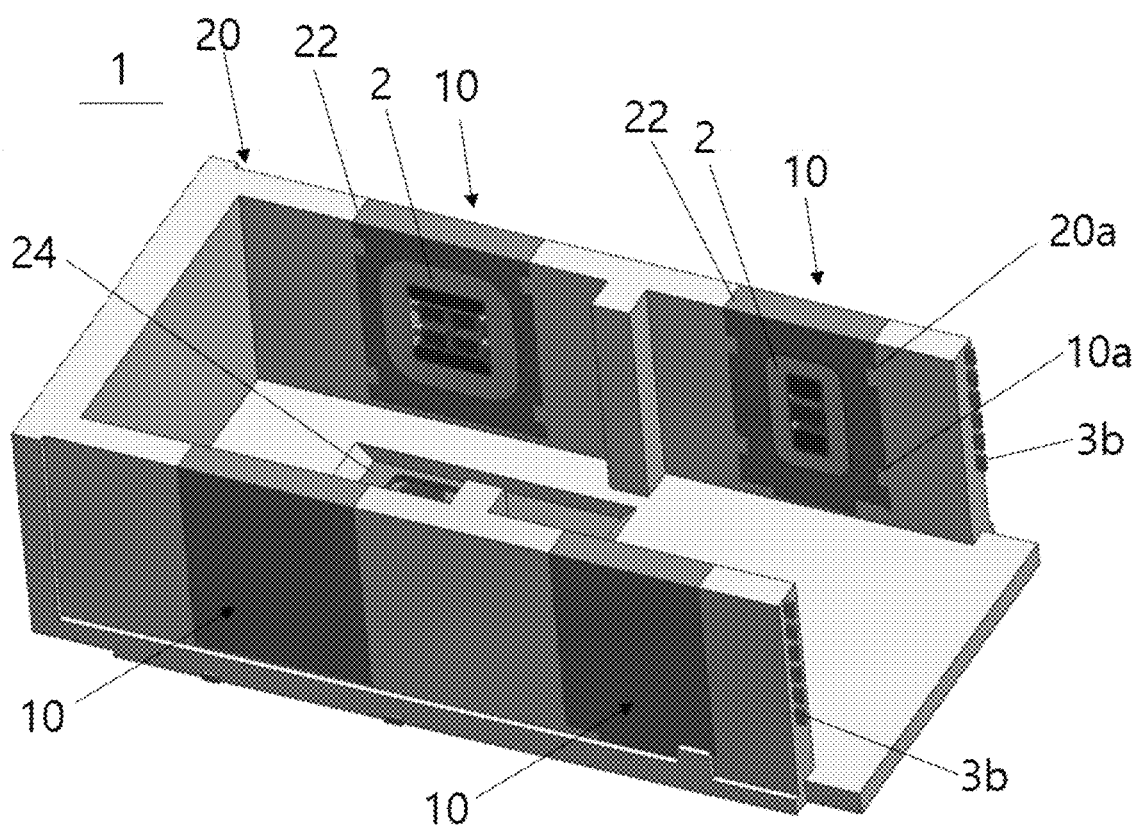

FIGS. 1 to 3 are views showing a motor frame adapted to an optical instrument actuator according to an embodiment of the present invention.

The motor frame 1 applied to the optical instrument actuator according to the embodiment of the present invention, which is configured such that a plurality of coils 2 can be disposed in the magnetic field of a magnet, includes a frame body 10 and 20 injection-molded by inserting a conductive circuit member 3 configured to form a circuit pattern electrically connected to the coils 2. Thus, as the circuit member 3 is integrated with the frame body 10 and 20 during injection molding, a manufacturing process may be simplified as a post-process for coupling to the circuit member 3 can be omitted, and the quality may be improved as assembly tolerances can be eliminated by injection molding the frame body 10 and 20 so as to fit the circuit member 3 tightly.

Meanwhile, injection molding of the frame body 10 and 20 is performed at a fairly high temperature, and since electronic components such as the coils 2 are relatively vulnerable to high temperatures, the frame body 10 and 20 may be injection-molded twice in order to protect the electronic components such as the coils 2 from high temperatures during the injection molding process.

Specifically, the circuit member 3 includes a plurality of component mounting portions (not shown) on which the electronic components such as the coils 2 are mounted, and a connection circuit portion 3a electrically connected to the component mounting portions. The component mounting portions replace a conventional printed circuit board (PCB or FPCB), and each of the component mounting portions is preferably configured in the form of a panel; however, the present invention is not necessarily limited thereto. The connection circuit portion 3a may include linear leads.

The frame body 10 and 20 may include a protective holder 10 injection-molded by inserting the component mounting portions and a frame structure 20 injection-molded by inserting the protective holder 10 and the circuit member 3 integrated by an automation apparatus or the like after the electronic components such as the coils 2 are mounted on the component mounting portions in the state in which the component mounting portions are inserted in the protective holder 10.

That is, the protective holder 10 may be formed by first insert injection molding to protect the electronic components such as the coils 2 and the component mounting portions, and in this state, the frame structure 20 may be formed by second insert injection molding. Therefore, compared to a method of inserting the circuit member 3 without the protective holder 10, the electronic components such as the coils 2, which are relatively vulnerable to high temperatures, may be protected to prevent damage, and the frame structure 20 may be molded at a higher temperature, whereby materials having excellent heat resistance may be used as the material for the frame structure 20.

When injection molding the frame structure 20, the protective holder 10 may be formed so as to surround the component mounting portions such that the component mounting portions do not come into contact with a hot injection melt forming the frame structure 20. Preferably, the protective holder 10 includes a front portion 11 having an opening 11a formed along the edges of the fronts of the component mounting portions in which the coils 2 are mounted such that the coils 2 face the magnet through the opening, a rear portion 12 configured to cover rear surfaces of the component mounting portions, and a peripheral portion 13 formed along a periphery between the rear portion 12 and the front portion 11. That is, insert molding may be performed as if the component mounting portions are embedded in the protective holder such that the component mounting portions are integrated with the protective holder. Meanwhile, when annularly wound coils 2 are mounted on the component mounting portions and other electronic components, such as an IC, are mounted in the space formed by the inner circumferential surfaces of the coils 2, the opening 11a is preferably formed in the state in which the inner surface forming the opening of the front portion is in contact with the outer circumferential surfaces of the coils 2.

The frame structure 20 may form a wall of the frame body 10 and 20, may have a holder receiving portion 22 configured to receive the protective holder 10, and may be configured to allow the connection circuit portion 3a of the circuit member 3 connected to the component mounting portions in a state of being integrally formed therewith to be embedded in the wall of the frame body 10 and 20.

Preferably, the protective holder 10 is formed in the shape of a block, has a thickness corresponding to the wall of the frame body 10 and 20, and has a height slightly lower than the wall of the frame body 10 and 20. The holder receiving portion 22 may be formed in the shape of a recess corresponding to the protective holder 10. That is, the recess forming the holder receiving portion 22 may have a shape corresponding to the protective holder 10, may have an inlet 22a in one end surface thereof in the height direction of the frame body 10 and 20, and may be open on both the inner and outer surfaces in the thickness direction of the frame body 10 and 20. Thus, the frame structure 20 and the protective holder 10 may be integrated to form the wall of the frame body 10 and 20. However, the protective holder 10 and the holder receiving portion 22 corresponding thereto are not necessarily limited thereto.

The protective holder 10 and the frame body 20 may have an engagement structure formed where the protective holder and the frame body are in contact with each other. For example, a plurality of engagement recesses 10a may be formed in the protective holder 10, and a plurality of engagement protrusions 20a configured to be engaged with the engagement recesses 10a may be formed on the frame structure 20, whereby more reliable coupling between the protective holder 10 and the frame structure 20 may be maintained.

Meanwhile, in forming the circuit member 3, a conductive panel such as a metal plate may first be photo-etched or pressed to form a panel having a circuit pattern in which the plurality of component mounting portions and the connection circuit portion 3a are integrally connected to each other, and then the parts of connection circuit portion 3a connected to the component mounting portions may be bent to form the circuit member 3 in a shape that surrounds the magnet, i.e., in the shape of a frame.

When injection molding the protective holder 10, a plurality of protective holders 10, in each of which each of the plurality of component mounting portions is inserted, may be injection-molded by inserting the circuit member 3 in the form of a panel or in the form of a frame. That is, the plurality of protective holders 10 may be injection-molded by a single process, and the plurality of protective holders 10 and the circuit member 3 may be integrated. At this time, the circuit member 3 may be configured in the form of a frame after the plurality of protective holders 10 is injection-molded by inserting the circuit member 3 configured in the form of a panel, or the circuit member 3 may be inserted in a state of being configured in the form of a frame.

In addition, when injection molding the frame structure 20, the circuit member 3 configured in the form of a frame and the plurality of protective holders 10 may be inserted in an integrated state such that frame structure can be injection-molded so as to surround the magnet together with the circuit member 3.

Specifically, the circuit member 3 may be configured in the form of a polyhedral frame by bending the circuit member into a "7" shape or a "[" shape. One or more component mounting portions may be provided on a side surface and/or a bottom surface of the circuit member 3 configured in the form of a frame. The frame body 10 and 20 may be formed as a polyhedron corresponding to the frame shape of the circuit member 3, or may include a polyhedron having a shape that extends beyond the circuit member 3.

Thus, first injection molding of the plurality of protective holders 10 may be performed by inserting the circuit member 3 in which the plurality of component mounting portions and the connection circuit portion 3a are integrated, and second injection molding may be performed by inserting the plurality of protective holders 10 and the circuit member 3 in an integrated state, whereby the frame body 10 and 20 may be formed so as to surround the magnet, and post-processes such as assembly of the circuit member 3 and the frame body 10 and 20 and electrically connection of the component mounting portions may be omitted, whereby it is possible to simplify the manufacturing process and to eliminate assembly tolerances, resulting in excellent quality.

Meanwhile, the protective holder 10 and the frame structure 20 may be injection-molded by inserting the circuit member 3 in the state in which a terminal portion 3b of the circuit member 3 is connected to a jig of an injection molding mold.

The terminal portion 3b is formed at an end of the connection circuit portion 3a for electrical connection to an external circuit or the like, and protrudes outwardly from the frame structure 20, or a recess or hole-shaped passage (not shown) or connected to the terminal portion 3b is formed in the frame structure 20.

Thus, the terminal portion 3b may be used as a bridge for inserting the circuit member 3 or the plurality of protective holders 10 together with the circuit member 3 in the injection molding mold, whereby it is not necessary to provide a separate bridge for the circuit member 3 or the plurality of protective holders 10, and therefore the manufacturing process may be simplified and the quality may be improved. The length of the terminal portion 3b also serving as the bridge may be increased so as to be greater than the length of the terminal portion according to the intended use thereof in order to facilitate connection to the jig, and the terminal portion 3b may be cut to size after the frame body 10 and 20 is injection-molded by inserting the circuit member 3.

In addition, the frame structure 20 may have a hole-shaped opening 24 having an inlet formed in a peripheral surface thereof such that a part of the connection circuit portion 3a embedded in the frame structure 20 can be exposed to the outside of the frame structure 20. Thus, access to the circuit member 3 may be possible through the opening 24 of the frame structure 20.

In addition, protrusions 3c protruding from the connection circuit portion 3a independently of the circuit pattern may be embedded in the frame structure 20, whereby the circuit portion 3 may be more firmly coupled to the frame structure 20.

A specific embodiment of injection molding the frame body 10 and 20 by inserting the circuit member 3 as described above will be described as follows.

First, as shown in FIG. 1, the circuit member 3 may be bent in a "¬" shape so as to include one bottom surface and one side surface protruding upward from the edge of one side of the bottom surface, two component mounting portions may be provided on the side surface, and a terminal portion 3b may be provided at an end of a connection circuit portion 3a forming the bottom surface.

The frame body 10 and 20 may include a bottom surface and three side surfaces protruding upward from the bottom surface in a "[" shape, two openings may be formed in the bottom surface, and a terminal portion 3b may be molded in a protruding state through one side of the bottom surface.

Alternatively, as shown in FIG. 2, the circuit member 3 may be bent in a "[" shape so as to include two side surfaces facing each other and a bottom surface connecting lower ends of the two side surfaces to each other, two component mounting portions may be provided on each of the two side surfaces, and a terminal portion 3b may be provided at an end of a connection circuit portion 3a forming the bottom surface.

The frame body 10 and 20 may include a bottom surface and three side surfaces protruding upward from the bottom surface in a "[" shape, two openings may be formed in the bottom surface, and a terminal portion 3b may be molded in a protruding state through one side of the bottom surface.

Alternatively, as shown in FIG. 3, the circuit member 3 may include a bottom surface and three side surfaces bent upward from the bottom surface in a "[" shape, two component mounting portions may be provided on each of two side surfaces facing each other, and a terminal portion 3b may be provided on each of both ends of the connection circuit portion 3a corresponding to both ends of the "[".

The frame body 10 and 20 may include a bottom surface and three side surfaces protruding upward from the bottom surface in a "[" shape, one opening may be formed in the bottom surface, and a terminal portion 3b may be molded in a protruding state through the side surfaces.

DESCRIPTION OF REFERENCE NUMERALS

1: Motor frame 2: Coil
3: Circuit member 3*a*: Connection circuit portion
3*b*: Terminal portion 10: Protective holder
20: Frame structure

The invention claimed is:

1. A method of manufacturing a motor frame applied to an optical instrument actuator having coils disposed in a magnetic field of a magnet, the method comprising:
   (a) inserting a circuit member having a predetermined circuit pattern electrically connected to electronic components and injection molding a resin at a first injection temperature to form a plurality of protective holders;
   (b) placing the electronic component on each of the protective holders to form an insert structure;
   (c) bending the circuit member to deform the insert structure; and
   (d) inserting the insert structure deformed in step (c) and injection molding resin at a second injection temperature to form a frame structure, wherein
   the circuit pattern comprises:
   a plurality of component connection pattern portions electrically connected to the electronic components, respectively; and
   a circuit connection pattern portion configured to connect the plurality of component connection pattern portions to each other, and
   step (c) comprises bending the circuit connection pattern portion.

2. The method according to claim 1, wherein, in step (a), the circuit member is flat.

3. The method according to claim 2, wherein
   the plurality of protective holders is injection-molded by inserting the circuit member in a state in which a plurality of component mounting portions and a connection circuit portion are integrally formed, and
   the frame structure is injection-molded by inserting the circuit member formed so as to surround the magnet by bending parts of connection circuit portion connected to the component mounting portions.

4. The method according to claim 1, wherein step (d) comprises molding the frame structure in a form in which at least a part of the circuit connection pattern portion is embedded in a resin.

* * * * *